United States Patent [19]

Johansson

[11] 4,211,453
[45] Jul. 8, 1980

[54] ROCK DRILL BIT LUBRICATION SYSTEM

[75] Inventor: Carl E. Johansson, Le Lavandou, France

[73] Assignee: SKF Industrial Trading and Development Co. B.V., Nieuwegein, Netherlands

[21] Appl. No.: 968,273

[22] Filed: Dec. 11, 1978

Related U.S. Application Data

[63] Continuation of Ser. No. 786,804, Apr. 12, 1977, abandoned.

[30] Foreign Application Priority Data

Apr. 12, 1976 [NL] Netherlands ............... 7603835

[51] Int. Cl.² ............................................. F16C 19/49
[52] U.S. Cl. .................................. 308/8.2; 308/207 R
[58] Field of Search ............... 308/8.2, 35, 36.3, 36.1, 308/76, 77, 78, 174, 175, 176, 187, 187.1, 187.2, 189, 207 R; 175/371, 372

[56] References Cited

U.S. PATENT DOCUMENTS 3,307,645  3/1967  Hildebrandt .................. 175/372
3,921,735  11/1975  Dysart ........................... 308/8.2

Primary Examiner—Lenard A. Footland
Attorney, Agent, or Firm—Daniel M. Rosen; J. David Dainow

[57] ABSTRACT

A drill bit for conical cutting elements, each secured to a bit segment by an annular locking bearing which is fed by a first lubrication system which directs high pressure lubricant through the bit segment and locking bearing to space external of the drill bit at lower atmospheric pressure; each cutting element is further coupled to the bit segment by a second annular bearing radially inward of the locking bearing and lubricated by a second lubrication system independent of the first; the second lubrication system defines a closed space containing lubricant and the second bearing with one boundary of this space being a flexible wall whose outside surface is exposed to the atmospheric pressure external of the drill, the wall being deflectable to equalize the pressure of the second lubrication system with the atmospheric pressure.

13 Claims, 1 Drawing Figure

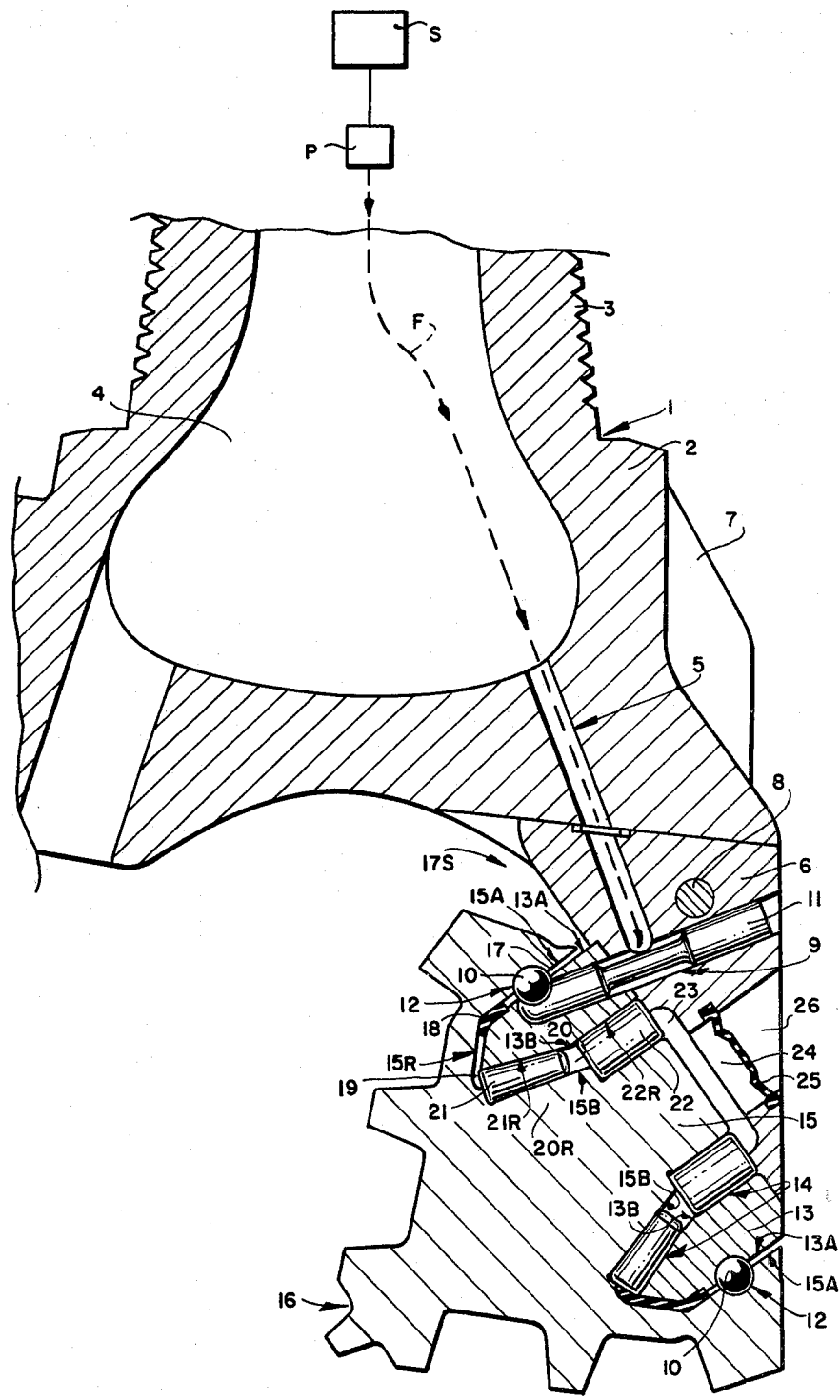

ROCK DRILL BIT LUBRICATION SYSTEM

This is a continuation of application Ser. No. 786,804, filed Apr. 12, 1977, now abandoned.

BACKGROUND OF THE INVENTION

The invention relates to a drill bit for drilling relatively deep holes in rock in the earth's crust. Such a bit is composed essentially of a bit body connectable to a string of pipes and comprises several limbs or bit segments upon which conical cutting elements are freely rotatably journalled, each element having a journal or neck that forms part of the journal bearing, as generally taught in the prior art U.S. Pat. No. 3,307,645. This invention relates more particularly to the problems of sealing, cooling and retaining such bearings.

SUMMARY OF THE INVENTION

The present invention now discloses a drill bit of the aforesaid type which offers a solution to the problem of bearing sealing and moreover permits a greatly improved design of ball lock or retaining bearing known per se to the art. Accordingly, in the present invention, the outer race of the bearing system is an element that is removably connected to the bit segment and has an outer surface which forms together with the inner surface of the cutting element a slit-shaped space. One side of this space is in open communication with the space outside the drill bit, while into the other side of said space, several ducts discharge or feed fluids at relatively high pressures during operation. This arrangement is provided so that the bearing seal is formed by pressure differences that eventually prevail in the slit-shaped space between its closed and open ends. As a result of this arrangement, known mechanical sealing means such as packing rings can be effectively replaced by a liquid seal inasmuch as liquid pumped through the pipe string during drilling is forced under pressure from inside the bearing race to outside. With this liquid a seal is obtained without affecting the actual journal bearing located on the other side of the slit-shaped seal. This is in contrast to the bit design described in French Pat. No. 1,053,319, wherein some of the drilling fluid is used as a coolant for a plain bearing, for which purpose it is pumped via a system of ducts right up to the bearing.

According to a preferred embodiment of the new invention, the drill bit comprises a system of ducts, one of which runs through a segment or part thereof and the bearing's outer race and terminates in the slit-shaped space, while a second duct forms an open communication between the aforesaid pipe and a cavity or liquid chamber in the bit body. By this arrangement the drilling fluid, typically "watery" mud, is enabled to flow along the pipe string to which the bit is affixed, via the chamber or cavity in the bit body, into the above-described duct system and thence be discharged along the slit-shaped space to the space's open end. This effectively prevents intrusion against the liquid pressure of fine drillings from outside the bit into the bearing system.

In order to secure stable attachment of a cutting element to the bearing system, there are known ball retaining bearings in the prior art. However, a preferred embodiment of the invention is distinguished over such prior art by the slit-shaped space being in communication with a circular duct forming an outer race and containing rolling elements arranged around the journal of a cutting element. The open end of the slit-shaped space connects with another duct that goes through a bit segment. With such an arrangement, the retaining bearing constitutes a locking mechanism of relatively large diameter for the cutting element on the journal bearing and at the same time forms part of the fluid seal. Moreover, the mean diameter of the retaining bearing should preferably be equal to the external diameter of the journal bearing's outer race. With this structure, more balls or other rolling elements can be fitted in the circular duct than was previously possible which results accordingly in a stable attachment of the cutting element on the bit segment.

As thus described, the invention provides a drill bit which, because of the fluid seal and improved positioning of the ball or roller bearing lock, i.e. the retaining bearing, has a much longer service life than other drill bits of the same type known in the prior art. In these prior art bits, there is in the open end of the slit-shaped space, a mechanical seal such as a packing ring which suffers heavy wear and is prematurely damaged by the finely divided drilling dust that enters this zone.

The invention will now be explained in detail with reference to the drawing attached, whereby its other advantages and distinguishing features will at the same time be disclosed.

BRIEF DESCRIPTION OF THE DRAWING

The FIGURE shows a partial cross-sectional view of the drill bit of the new invention.

DETAILED DESCRIPTION OF THE PREFERRED EMBODIMENT

In the FIGURE, the drill bit 1 consists essentially of a bit body 2 provided at the top with a screw-thread 3 by means of which bit 1 can be connected to a string or series of end-to-end pipes (not shown). Via this pipe string fluid is pumped into the cavity or chamber 4 and some of it makes it way into the duct located partly in the bottom of the bit body 2 and partly in a part 6 of the bit segment 7. In this embodiment the bit segment part 6 is essentially wedge-shaped, as described in U.S. Pat. No. 4,084,649, in the name of the present applicant. This segment part 6 is secured to the segment 7 with a fixing or coupling pin 8. In the segment part 6 is a second duct 9 that communicates with duct 5. This duct 9 has a diameter suitable to guide the ball or other rolling elements 10, into duct 12; and at the same time duct 9 contains an end coupling pin 11 extending from the foremost part of duct 9 in segment 6 into ring 13 and adjacent duct 12 for securing elements 10 therein. Duct 9 is thus formed partially in the annular element or ring 13 of the journal bearing. The duct 12 connecting with duct 9 is circular and disposed around the journal or neck or shaft 15 of the journal bearing 14. Thus part of duct 12 is formed in the cutting element 16 and the remaining part in the outside of the ring 13. By reason of the rolling elements or balls 10 having been positioned via duct 9 into the circular duct 12 in the cutting element 16 and ring 13, a stable retaining bearing is thus obtained; consequently, the bearing is located around as large a diameter as possible in the cutting element 16 and in fact some distance outside the actual journal bearing.

According to the invention, duct 12 is in open communication with both duct 9 and the slit-shaped space 17 located between the outside of the ring 13 and part of the inside of the cutting element 16. At some distance from the retaining bearing or locking ball bearing 10, 12 is an annular seal 18 that separates a first part of the slit-shaped space 17 from a second part 19. Space 19 communicates with a space 20 belonging to the second duct system, said space 20 being filled with two rows of roller elements 21 and 22. One of these roller elements 21 is tapered and the other, 22, is cylindrical. It should be noted that the journal bearing provided by elements 21 and 22 can equally well have other types of rolling elements, or can be a sliding bearing or a combination of sliding and rolling bearings. The raceways for roller elements 21 and 22 are formed in the inside of the ring 13 and the outside of the neck or journal 15.

The second duct system is formed in this embodiment by the aforesaid slit-shaped space 19, the space 23 at the head of the journal 15 and a chamber 24 being contiguous to said space 23 and having a wall 25 made of flexible material. This flexible wall 25 serves essentially as a diaphragm and for this purpose, wall 25 communicates via a duct 26 with the space outside the drill bit. Chamber 24 and duct 26 are preferably situated in the bit segment 6.

The new drill bit described above will now be summarized, with reference to the single figure of the drawing. There are two duct systems for lubricating the bearings. The first duct system comprises chamber 4 and high pressure fluid therein, duct 5 for feeding fluid into duct 9 and thence to duct 12 which also serves as a raceway for balls 10, and space 17. Lubricant flowing through this first duct system discharges via space 17 into space 17S external of the drill bit where the atmospheric pressure may be lower than the high pressure in the first duct system. The second duct system is a closed space containing lubricant for bearings 21 and 22; this second system includes the raceways in which these bearings roll, the spaces 19, 20 and 23 adjacent these bearings, and the chamber 24 bounded by flexible wall 25.

The cutting element 16 has neck part 15 defined by an annular recess 15R which has outer circumferential surface 15A and inner circumferential surface 15B. The annular element or ring 13 is situated concentrically within this recess, with the outer surfaces 13A of the ring adjacent outer surface 15A of the recess, and inner surface 13B of the ring adjacent surface 15B of the recess. The adjacent surfaces 15A and 13A include the bearing surfaces which define duct 12 which is also the first raceway and contains balls 10. This first raceway and balls 10 in combination form a locking bearing to secure cutting element 16 onto ring 13 of bit segment 6. The adjacent surfaces 13B and 15B are boundaries of space 20 and include the bearing surfaces which form a second raceway area 20R radially inward of the first raceway 12. The specific embodiment illustrated raceway 20R subdivided into separate bearing surfaces forming raceways 21R and 22R for the roller bearing elements 21 and 22 respectively. Annular seal 18 separates the second duct or lubrication system and bearings 21 and 22 therein from the first duct and lubrication system including balls 10 in raceway 12.

The working of the fluid system in the drill bit during operation is as follows: The drill bit 1 is screwed onto a string of pipes (not shown) which can be caused to rotate by a drive unit. The actual drilling action of the bit into the earth's crust is brought about by a combination of rotation and pressure. At the same time a pump unit (not shown but indicated on the drawing by the symbol marked "P") forces fluid, in most cases muddy water (not shown but indicated by symbol S in the drawing) into the pipes. This fluid, or at any rate, most of it, serves to flush the drill cuttings, and to this end the fluid is squirted around the rotating cutters during drilling.

According to the present invention, however, some of this fluid is used to make a seal. For this purpose, the fluid flows (as indicated by dashed-line with reference symbol F) into and through chamber 4, via a duct 5, along duct 9, then through the circular duct 12 into the slit-shaped space 17, and then is forced towards the outside of the drill bit. This fluid transport is accomplished by virtue of the pressure in the chamber 4, communicating through duct systems 5, 9, and 12 and space 17, being higher than that outside the drill bit, at least while the pump unit is in operation. This high pressure urges the fluid through the first duct system 5, 9 and 12 to space 17 and the external space outside the drill bit.

The second duct system 19, 20, 23 and 24 includes a flexible wall 25, exposed to the effect of the pressure that prevails outside the drill bit. By suitably choosing or specifically shaping the flexible wall 25, one can assure that it is pressed in or displaced to an extent that is a function of the drilling depth, whereby the pressure in the chamber 24 filled with a medium, e.g. a lubricant, in this second duct system will likewise be affected accordingly.

It must be emphasized that the invention is not confined to the embodiment of a drill bit herein described, inasmuch as the inventive idea extends also to designs where systems of ducts or such similar fluid transport means can be applied to obtain a fluid seal between a rotating cutting element and the static parts of the bearing or drill bit parts.

What is claimed is:

1. In a drill bit including a body part, a first chamber in said body part for containing a fluid lubricant under pressure higher than atmospheric during operation of the drill bit, at least one bit segment extending from said body part, a generally conical cutting element mounted on said bit segment and freely rotatable thereon thus forming a cutting element assembly, the improvement in combination therewith, wherein: said bit segment includes an annular part having inner and outer circumferential bearing surfaces, said conical cutting element has corresponding bearing surfaces adjacent those of said annular part thereby forming two pairs of bearing surfaces defining first and second raceways, the second raceway being radially outward of the first raceway, said second raceway further includes a plurality of ball bearing elements distributed therein, this second raceway and ball bearing elements forming a locking bearing for retaining said conical cutting element coupled to said annular part of said bit segment, said cutting element assembly further comprising a plurality of rolling bearing elements distributed in said second raceway forming an inner bearing, and lubrication means for lubricating said raceways and bearing elements therein.

2. A drill bit according to claim 1 wherein said lubrication means comprises a first lubrication system for said locking bearing comprising first duct means for conveying said lubricant from said first chamber to said locking bearing, second duct means communicating said locking bearing with an external space outside the drill bit at atmospheric pressure, whereby said lubricant is caused to flow from said first chamber into said locking bearing and thence to said external space, said cutting element assembly further comprising first seal means for sealingly separating said locking bearing from said second raceway.

3. A drill bit according to claim 2 wherein said lubrication means comprises a second lubrication system for said inner bearing comprising a second chamber defined at least, partially by said bit segment for containing a quantity of lubricant, third duct means communicating said second chamber with said inner bearing, said second lubrication system comprising a flexible wall having an inside surface defining one boundary of said second lubrication system and an outside surface communicating with said external space at atmospheric pressure, said flexible wall being adopted to deflect during operation of said drill bit until the pressure within said second chamber becomes equalized with pressure in said external spaces.

4. A drill bit according to claim 2 wherein said first duct means comprises a first duct through said body part into said bit segment and a second duct through said bit segment and annular part and communicating with said first duct and said first raceway, said second duct having diameter dimensioned to permit entry of said rolling bearing elements into said first raceway, said drill bit further comprising means for preventing said rolling bearing elements from moving out of said first raceway into said second duct.

5. A drill bit accordingly to claim 4 wherein said annular part is separable from said bit segment, said drill bit further comprising a coupling pin removably situated in said second duct for securing said annular part to said bit segment, said coupling pin having an intermediate part adjacent said first duct, a remote end part adjacent said first raceway, and an exposed axial groove from said intermediate part to said remote part for permitting flow of said lubricant from said first duct, along said groove through said second duct to said first raceway.

6. A drill bit according to claim 1 wherein said conical cutting element has a central axis of rotation, a base part transverse of said axis, an annular recess in said base part and concentric with said axis, said recess having outer and inner annular walls which define said bearing surfaces of said cutting element which partially form said locking and inner bearings respectively, said conical cutting element further comprising a central neck part whose outer periphery is defined by said inner annular walls, said annular part of said bit segment being situated at least partially in said recess, and said neck part of the cutting element situated at least partially within said annular part.

7. A drill bit according to claim 6 wherein said inner bearing comprises two axially spaced raceways with said bearing elements distributed therein.

8. A drill bit according to claim 1 wherein said locking bearing has a mean diameter approximately equal to the outer diameter of said inner bearing.

9. In a drill bit including a body part, a first chamber in said body part for containing a fluid lubricant under pressure higher than atmospheric during operation of the drill bit, at least one bit segment extending from said body part, a generally conical cutting element mounted on said bit segment and freely rotatable thereon thus forming a cutting element assembly, the improvement in combination therewith, wherein: said bit segment includes an annular part having inner and outer circumferential bearing surfaces, said conical cutting element has corresponding bearing surfaces adjacent those of said annular part thereby forming two pairs of bearing surfaces defining first and second raceways, the second raceway being radially outward of the first raceway, said raceways each including a plurality of rolling bearing elements distributed therein, said improvement further comprising first and second independent lubrication systems for lubricating said outer and inner raceways respectively, said first lubrication system comprising first duct means for conveying said lubricant from said first chamber to said first raceway, second duct means communicating said first raceway with an external space outside the drill bit at atmospheric pressure, whereby said lubricant is caused to flow from said first chamber into said first raceway and thence to said external space, said cutting element assembly further comprising first seal means for sealingly separating said first and second raceways, said second lubrication system comprising a second chamber defined at least partially by said bit segment for containing a quantity of lubricant, third duct means communicating said second chamber with said second raceway, a flexible wall having an inside surface defining one boundary of said second chamber and an outside surface communicating with said external space at atmospheric pressure, said flexible wall being adapted to deflect during operation of said drill bit until the pressure within said second chamber becomes equalized with pressure in said external space.

10. In a drill bit including a body part, a first chamber in said body part for containing a fluid lubricant under pressure higher than atmospheric pressure during operation of the drill bit, at least one bit segment extending from the body part, and a conical cutting element mounted on said bit segment and freely rotatable thereon thus forming a cutting element assembly, the improvement in combination therewith wherein said conical cutting element has a central axis of rotation, a base part transverse said axis, and an annular recess in said base part and concentric with said axis, said recess having outer and inner annular walls which define therein first bearing surfaces of greater and lesser diameter respectively and a bottom wall joining said side walls, said bit segment comprises an annular ring extending into said recess, said ring having outer and inner annular walls which define therein second bearing surfaces adjacent and forming with the first bearing surfaces outer and inner raceways respectively, said ring having an end wall connecting said side walls thereof, this end wall corresponding to and disposed adjacent said bottom wall of the recess, said drill bit further comprises rolling bearing elements in each of said raceways, and annular sealing means extending between said bottom and end walls of said recess and ring respectively for sealingly separating said two raceways, and said drill bit further comprises a first lubrication system conveying said lubricant from said first chamber, due to said relatively higher pressure therein to said first raceway and rolling bearing elements therein and from said first raceway to an external space outside of the drill bit at atmospheric pressure.

11. In a drill bit including a body part, a first chamber in said body part for containing a fluid lubricant under pressure higher than atmospheric pressure during operation of the drill bit, at least one bit segment extending from the body part, a generally conical cutting element mounted on said bit segment and freely rotatable thereon thus forming a cutting element assembly, the improvement in combination therewith wherein: said bit segment includes an annular part having inner and outer surfaces defining first and second bearing surfaces, said conical cutting element has corresponding surfaces adjacent said first and second bearing surfaces, thereby defining first and second raceways, said cutting element assembly further comprises locking ball bearing means in said second raceway and roller bearing means in said first raceway, said cutting element assembly further comprising first duct means for conveying said lubricant from said source to said first raceway, second duct means communicating said first raceway with an external space outside the drill bit at atmospheric pressure, third duct means communicating said first and second raceways, and first seal means for sealing said second raceway from said first raceway, whereby said lubricant is urged to flow from said source into and through said first raceway to said external space, said bit segment further defines a second chamber for containing a quantity of a second fluid lubricant and communicating with said second raceway and rolling bearing elements therein, said second chamber comprising as one boundary a flexible wall whose remote side communicates with said second space outside the drill bit, said flexible wall adapted to deflect during operation of the drill bit until the pressure within said second chamber becomes equalized with the pressure in said second space outside the drill bit.

12. A drill bit according to claim 11 wherein said first duct and second duct means comprise a continuous passage for lubricant flow from said first chamber to and through said first raceway to said external space due to said fluid pressure being greater in said first chamber than in said external space, as a first lubrication system, and said second chamber, second raceway, and said first seal means comprise a closed second lubrication system for said second raceway.

13. In a drill bit including a body part, a first chamber in said body part for containing a fluid lubricant under a pressure higher than atmospheric pressure during operation of the drill bit, at least one bit segment extending from the body part, a generally conical cutting element mounted on said bit segment and freely rotatable thereon, thus forming a cutting element assembly, the improvement in combination therewith wherein: said bit segment includes a ring having inner and outer surfaces defining first and second bearing surfaces, said conical cutting element defines an annular recess in which said ring is at least partially and concentrically situated, said recess defining circumferential walls defining thereon bearing surfaces corresponding to and adjacent said first and second bearing surfaces of said ring and forming therewith first and second raceway means, said cutting element assembly further comprising locking ball bearing means in said second raceway means, said first raceway means defining two axially spaced raceways with rolling bearing elements distributed therein, said cutting element assembly further comprising first duct means for conveying said lubricant from said source to said first raceway, second duct means communicating said first raceway with an external space outside said drill bit at atmospheric pressure, and first seal means for sealing said second raceway from said first raceway whereby said lubricant is urged to flow from said source into and through said first raceway to said external space.

* * * * *

UNITED STATES PATENT AND TRADEMARK OFFICE
CERTIFICATE OF CORRECTION

PATENT NO. : 4,211,453

DATED : July 8, 1980

INVENTOR(S) : Carl E. Johansson

It is certified that error appears in the above—identified patent and that said Letters Patent are hereby corrected as shown below:

Column 2, line 39, after "makes" change "it" to --its--.

Column 3, line 54, change "illustrated" to --illustrates--.

Column 5, line 6, after "at least" delete --,--.

Column 5, line 27, change "accordingly" to --according--.

Signed and Sealed this

Twenty-third Day of December 1980

[SEAL]

Attest:

SIDNEY A. DIAMOND

Attesting Officer

Commissioner of Patents and Trademarks